US 6,606,662 B2

(12) United States Patent
Nagasaki (10) Patent No.: US 6,606,662 B2
(45) Date of Patent: *Aug. 12, 2003

(54) PORTABLE TERMINAL APPARATUS AND COMMUNICATION METHOD THEREOF

(75) Inventor: Katsuhiko Nagasaki, Ichikawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,397

(22) Filed: Jun. 9, 1998

(65) Prior Publication Data

US 2002/0002612 A1 Jan. 3, 2002

(30) Foreign Application Priority Data

Jun. 11, 1997 (JP) .............................. 9-153337

(51) Int. Cl.[7] .......................... G06F 15/16; G06K 9/00; G06K 11/30
(52) U.S. Cl. ....................... 709/229; 709/202; 709/227; 382/187; 713/201; 713/202
(58) Field of Search ................................ 709/200, 229, 709/227, 202, 203; 382/187, 115; 395/326; 713/201, 202; 340/825.34; 235/382, 382.5, 375

(56) References Cited

U.S. PATENT DOCUMENTS

| | | | | |
|---|---|---|---|---|
| 5,644,653 A | * | 7/1997 | Sunakawa et al. ........... | 382/187 |
| 5,657,459 A | * | 8/1997 | Yanagisawa et al. ........ | 395/326 |
| 5,715,174 A | * | 2/1998 | Cotichini et al. ............ | 709/229 |
| 5,802,280 A | * | 9/1998 | Cotichini et al. ............ | 709/200 |
| 5,825,283 A | * | 10/1998 | Camhi ......................... | 340/438 |
| 5,928,363 A | * | 7/1999 | Ruvolo ........................ | 713/201 |
| 5,969,433 A | * | 10/1999 | Maggiora et al. ........... | 307/10.5 |
| 5,982,928 A | * | 11/1999 | Shimada et al. ............. | 382/187 |
| 6,006,332 A | * | 12/1999 | Rabne et al. ................ | 713/201 |

* cited by examiner

Primary Examiner—Kenneth R. Coulter
Assistant Examiner—Paul Kang
(74) Attorney, Agent, or Firm—Fitzpatrick, Cella, Harper & Scinto (57) ABSTRACT

The authorization of a user is performed in such a way that the user inputs one or more characters to a portable terminal apparatus using a pen input apparatus, and the handwriting of the input character(s) is compared with the handwriting of the authorized user, which is stored (e.g., in a flash ROM) in advance. When it is determined that the portable terminal apparatus is being used by an unauthorized user, a communication device is activated, and the server is notified of the fact that the portable terminal apparatus is being used by the unauthorized user.

27 Claims, 10 Drawing Sheets

PORTABLE TERMINAL APPARATUS AND COMMUNICATION METHOD THEREOF

BACKGROUND OF THE INVENTION

1. Field of the Invention

The present invention relates to a portable terminal apparatus and a communication method for use therein and, more particularly, to a portable terminal apparatus comprising information input means, such as a pen input apparatus, and means for communicating with external apparatuses, and a communication method for use therein.

2. Description of the Related Art

Portable terminal apparatuses are convenient information processing apparatuses which can be carried along and used by a user, and recently there has been an increasing number of such apparatuses which can be used in combination with a server.

Figure 7:
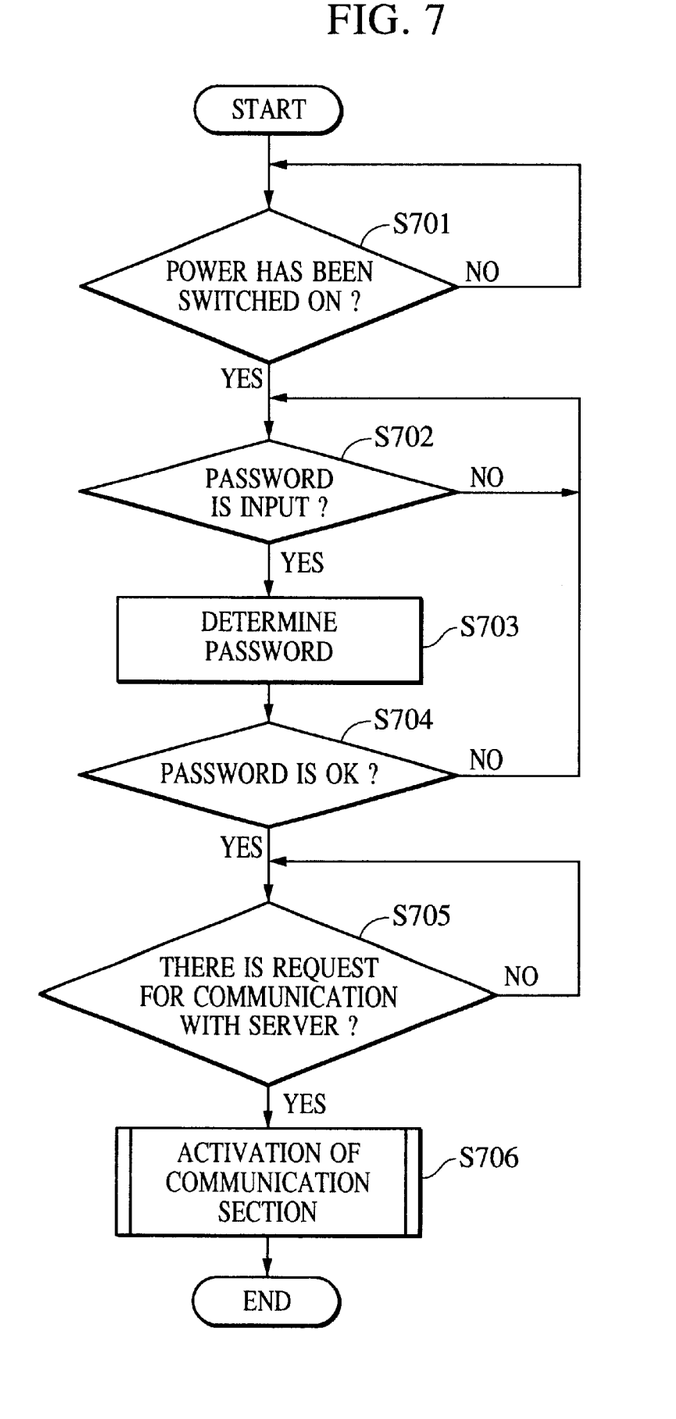
FIG. 7 is a flowchart of a conventional example.

When a portable terminal apparatus is used in combination with a server, the construction is formed such that the server has the data, and when the portable terminal apparatus uses the data of the server, communications are performed between them and the data is downloaded to the portable terminal apparatus and used. It is a matter of course that when the amount of data is small, there is no need to use the server, and the portable terminal apparatus can perform processing by itself. FIG. 7 is a flowchart of processing typical of such apparatuses.

Initially, when it is determined in step S701 that the power of the apparatus has been switched on, the process proceeds to step S702, where the apparatus awaits the input of a password. Various forms of password input are possible, such as text being simply keyed in or handwritten data being input. When a password has been input, the process proceeds to step S703, where a password determination process is performed. This process is a technology which is well known to a person skilled in the art, and description thereof has been omitted.

Next, a check is made in step S704 to determine whether the password matches. When the current user is an authorized user of the apparatus, the apparatus becomes operable. The above process may be performed when a specific application is initiated rather than when the power of the apparatus is switched on. Further, there is a case in which a password is input only on the first occasion and stored, and on the second occasion and later, the password is input and determined automatically, so that the apparatus can be used even if the user does not actually input a password.

Next, in step S705, the process awaits a request for communication with a server. Here, when the user initiates such a communication request, the process proceeds to step S706, where the communication means is initiated for the first time, and communication with the server is performed. That is, for the first time the server becomes aware of the fact that at this point the portable terminal apparatus is being used.

However, in the above-described conventional communication procedure, in the case where the terminal apparatus has been left outdoors or stolen, and the terminal apparatus passes into the possession of another person and is used illegally, there is the problem that unless the unauthorized user attempts to access the server in order to download data from the server, the authorized person who owns the apparatus is not aware of the unauthorized use. Of course, in the case where the password must be input after the power is switched on, the terminal apparatus cannot be used illegally unless the proper password is somehow input. However, in the case where the password is input when a specific application is initiated or a password automatic input is set, the apparatus may be used freely.

SUMMARY OF THE INVENTION

Accordingly, an object of the present invention, which has been achieved in view of the above-described points, is to provide a portable terminal apparatus which notifies an authorized user of use by an unauthorized user, and a communication method for use therein.

To achieve the above-described object, according to one aspect of the present invention, there is provided a portable terminal apparatus, comprising: information input means, and communication means for performing communication with an external apparatus over a network, wherein there is further provided: determination means for determining whether a current user is an authorized user; and control means for performing control in such a way that the communication means is activated to perform communications with the external apparatus according to a determination result by the communication means.

According to another aspect of the present invention, there is provided a communication method for use in a portable terminal apparatus comprising information input means and communication means for performing communication with an external apparatus over a network. The communication method comprises: a determination step for determining whether a current user is an authorized user; and a control step for performing control in such a way that the communication means is activated to perform communication with the external apparatus according to the determination result obtained in the determination step.

The above and further objects, aspects and novel features of the invention will become more apparent from the following detailed description when read in connection with the accompanying drawings.

DETAILED DESCRIPTION OF THE PREFERRED EMBODIMENTS

The preferred embodiments of the present invention will be described below with reference to the accompanying drawings.

(a) First Embodiment

Figure 1:
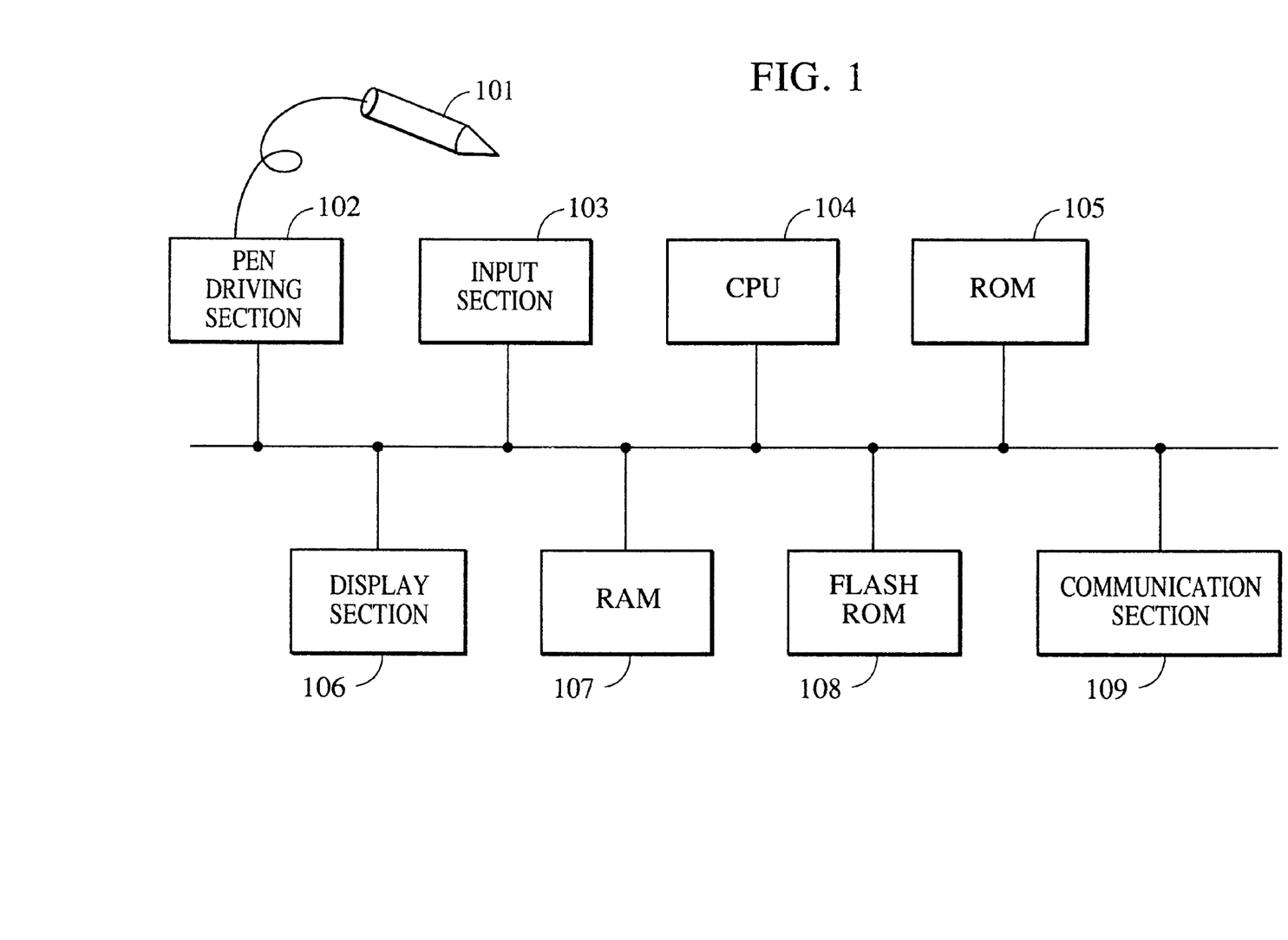
FIG. 1 is a block diagram of an apparatus according to a first embodiment of the present invention.

FIG. 1 shows a block diagram of the hardware configuration of the first embodiment of the present invention.

Reference numeral 101 denotes a pen input apparatus. Reference numeral 102 denotes a pen driving section for driving the pen input apparatus 101. Reference numeral 103 denotes an input section to which characters can be input from the pen input apparatus 101. Reference numeral 104 denotes a CPU 104 for performing the control of the entire apparatus. Reference numeral 105 denotes a ROM for storing programs for the method of the flowchart to be described below. Reference numeral 106 denotes a display section. Reference numeral 107 denotes a RAM used for a work area. Reference numeral 108 denotes a flash ROM for storing authorization information specific to authorized persons and information specific to terminals. Reference numeral 109 denotes a communication section for performing communications with the server.

Figure 2:
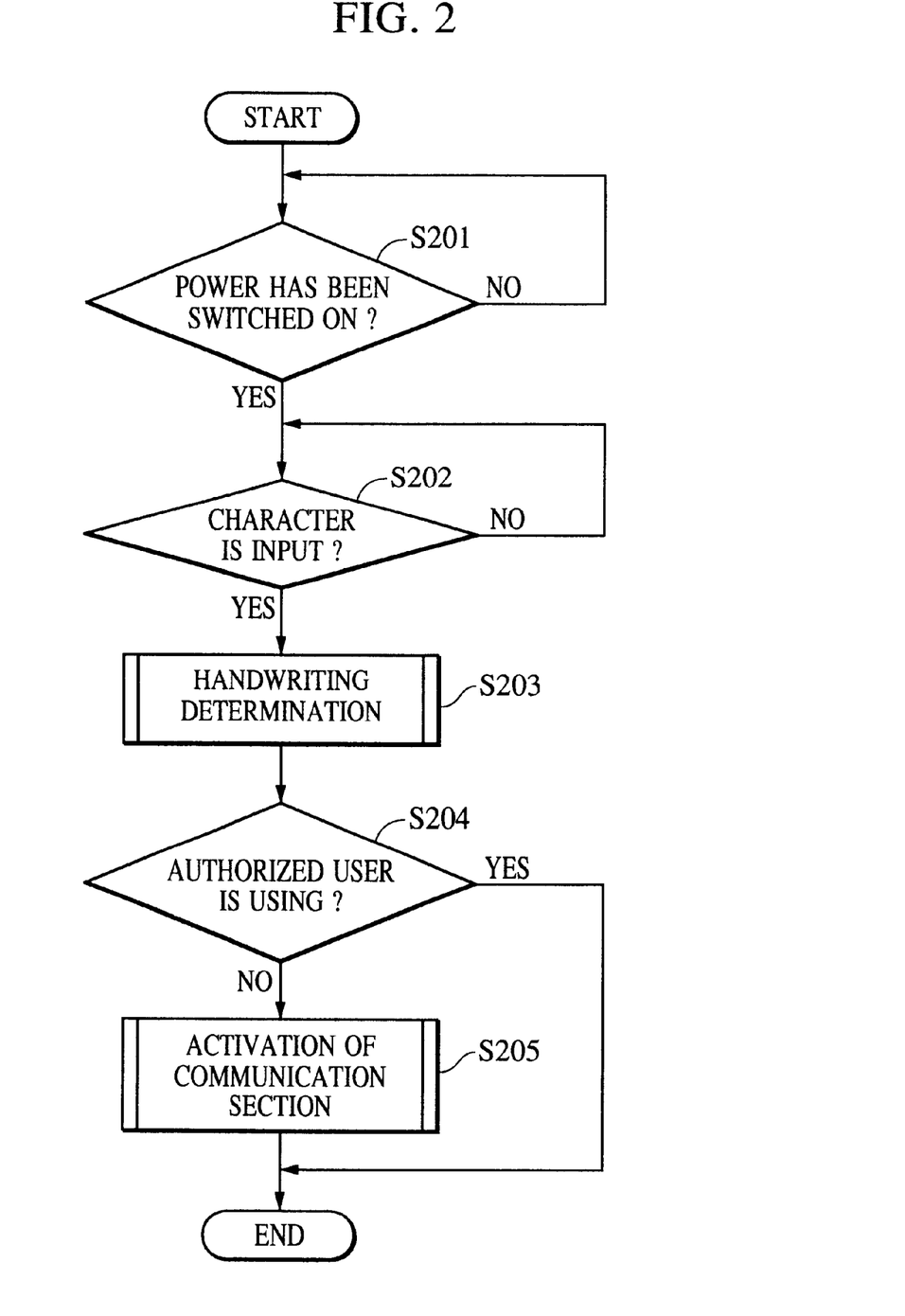
FIG. 2 is a flowchart of the first embodiment of the present invention.

Referring to the flowchart of FIG. 2, the process in this embodiment will be described below.

Initially, when it is determined in step S201 that the power has been switched on, the process proceeds to step S202, where a character input is awaited. When it is determined that a character has been input to the input section 103 by the pen input apparatus 101, the process proceeds to step S203, where a determination of handwriting is made. For the determination of handwriting, for example, certain features (for example, the input start point and end point of the stroke, the curved point, the minimum point, the maximum point, etc.) of the shape of the stroke input by an authorized user in advance, or the shape of a plurality of groups of strokes, are extracted, and these are registered. Then, the features of the input stroke shape which was made when personal authorization was requested is compared with the prestored features. When the similarity degree is high, a determination of it being the same writer is made.

Next, the process proceeds to step S204, and when it is determined in this step that the current user is an authorized user, who uses it normally, as a result of the determination of handwriting, the process proceeds to the end and terminates. When it is determined that the users are not the same, the process proceeds to step S205, where the communication section 109 for communicating with a server is activated. Various configurations for communicating with the server are possible. In this embodiment, a description will be given assuming that a portable terminal apparatus is being used having a built-in PHS (personal handy-phone system) function. First, the authorized user, that is, the owner, has information, which has been stored in the flash ROM 108, for accessing his/her server.

Figure 3:
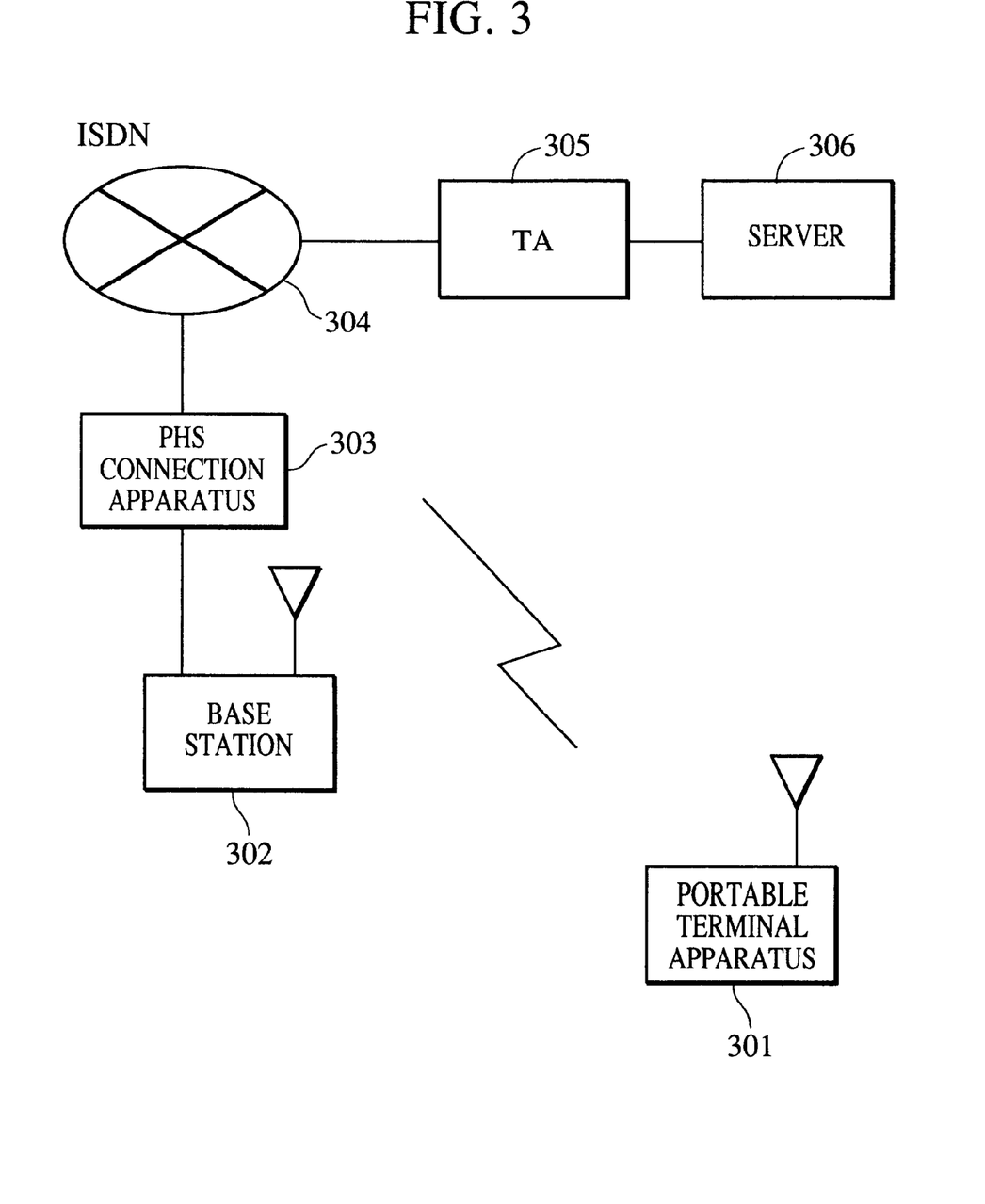
FIG. 3 is a view showing an example of connection between a portable terminal apparatus and a server.

FIG. 3 shows an example of the construction of the connection system between the portable terminal apparatus and the server.

Referring to FIG. 3, reference numeral 301 denotes a portable terminal apparatus. Reference numeral 302 denotes a base station. Reference numeral 303 denotes a PHS connection apparatus which connects the base station 302 to the public line. Reference numeral 304 denotes an ISDN (Integrated Services Digital Network). Reference numeral 305 denotes a terminal adapter (TA). Reference numeral 306 denotes a server.

Figure 4:
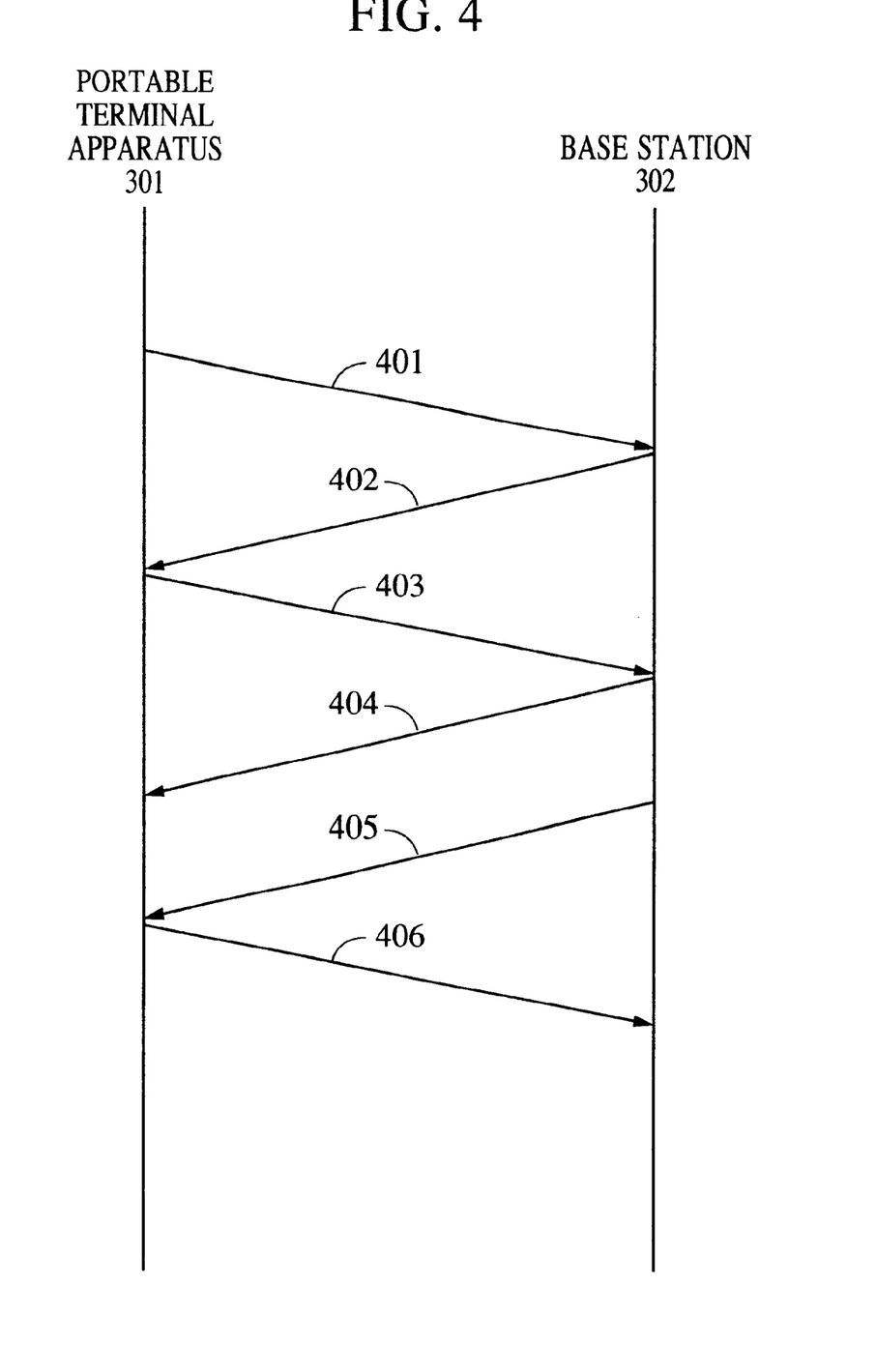
FIG. 4 is a view illustrating the communication procedure between the portable terminal apparatus and a base station of FIG. 3.

FIG. 4 shows an example of the communication procedure between the portable terminal apparatus and the base station.

In the portable terminal apparatus 301 of FIG. 3, when the communication section 109 is activated, a communication program stored in the ROM 105 is activated. The communication program causes a server number to be read from among the information specific to the owner (authorized user) stored in the flash ROM 108 and issues a link channel establishment request to the base station 302 (401).

In response to this, a link channel assignment is made from the base station 302 (402). Next, call setting is made from the portable terminal apparatus 301 (403). Then, the call setting is accepted from the base station 302 (404). Next, an authorization request is made from the base station 302 (405), and the portable terminal apparatus 301 responds to it in accordance with the information of the flash ROM 108 (406).

Thereafter, a connection is made from the base station 302 through the PHS connection apparatus 303, the ISDN 304, and the terminal adapter (TA) 305 to the server 306, and communications between them are performed. This procedure is a technology well known to a person skilled in the art, and therefore, description thereof has been omitted here. At this time, the data sent from the portable terminal apparatus 301 to the server 306 is a message informing of the unauthorized use of the portable terminal apparatus 301, which message is stored in the ROM 105 in advance.

As has been described thus far, even if the user of the portable terminal apparatus does not perform an operation for accessing the server, in the case where the portable terminal apparatus is not in the possession of an authorized user, it becomes possible to notify the server of this fact automatically.

(b) Second Embodiment

Although in the first embodiment the features of the user are determined by performing a determination of handwriting, another method may be used to perform this determination.

In this embodiment, an example in which a character recognition rate is used is described.

Figure 5:
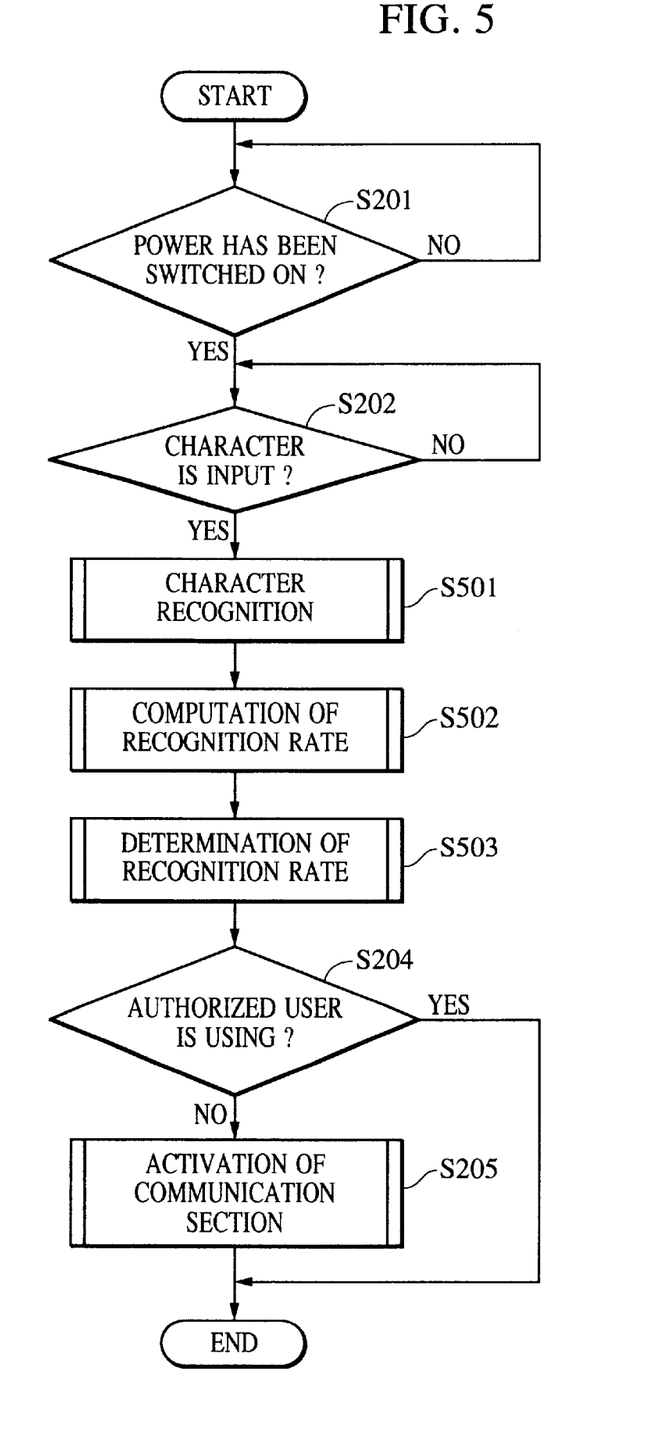
FIG. 5 is a flowchart of a second embodiment of the present invention.

FIG. 5 is a flowchart for describing in detail the process in this embodiment. Here, the processes which are the same as those of the above-described embodiment are given the same step numbers, and only different processing steps are described.

When it is determined in step S202 that a character has been input, the process proceeds to step S501, where a character recognition process which is well known to a person skilled in the art is performed. In this step, a process for recognizing the input character and displaying the result on the display section 106 is performed. Detailed description of the character recognition process has been omitted here. Next, when an input of characters of a number greater than or equal to a preset number of characters is made, the character recognition rate up to this point in time is computed (step S502). This is computed according to a specification by the user as to whether each character is recognized correctly, as the recognition results are displayed on the display section 106. Then, in step S503, this computed character recognition rate is compared with the character recognition rate that has been prestored in the flash ROM 108, for the input character by the authorized user.

When a difference greater than or equal to a predetermined value, which has been preset and prestored in the flash ROM 108, is present between them, it is determined in step S204 that the authorized user and the current user are different. The subsequent processing in step S205 is the same as that of the above-described embodiment.

According to this embodiment, since the character recognition function which is required for the portable terminal apparatus comprising a pen input apparatus is used and further a process of determination based on the character recognition rate is added, the user is capable of determining whether the user is authorized. Therefore, it becomes possible to obtain the same advantages in a construction that is simpler and easier than that of the above-described embodiment.

(c) Third Embodiment

In the first and second embodiments, when the authorized user has an injury to the hand or when another user uses the apparatus with the consent of the authorized user, unnecessary communications may be performed. Therefore, in this embodiment, the construction is formed such that password input means is provided so as to cope with such a case.

Figure 6:
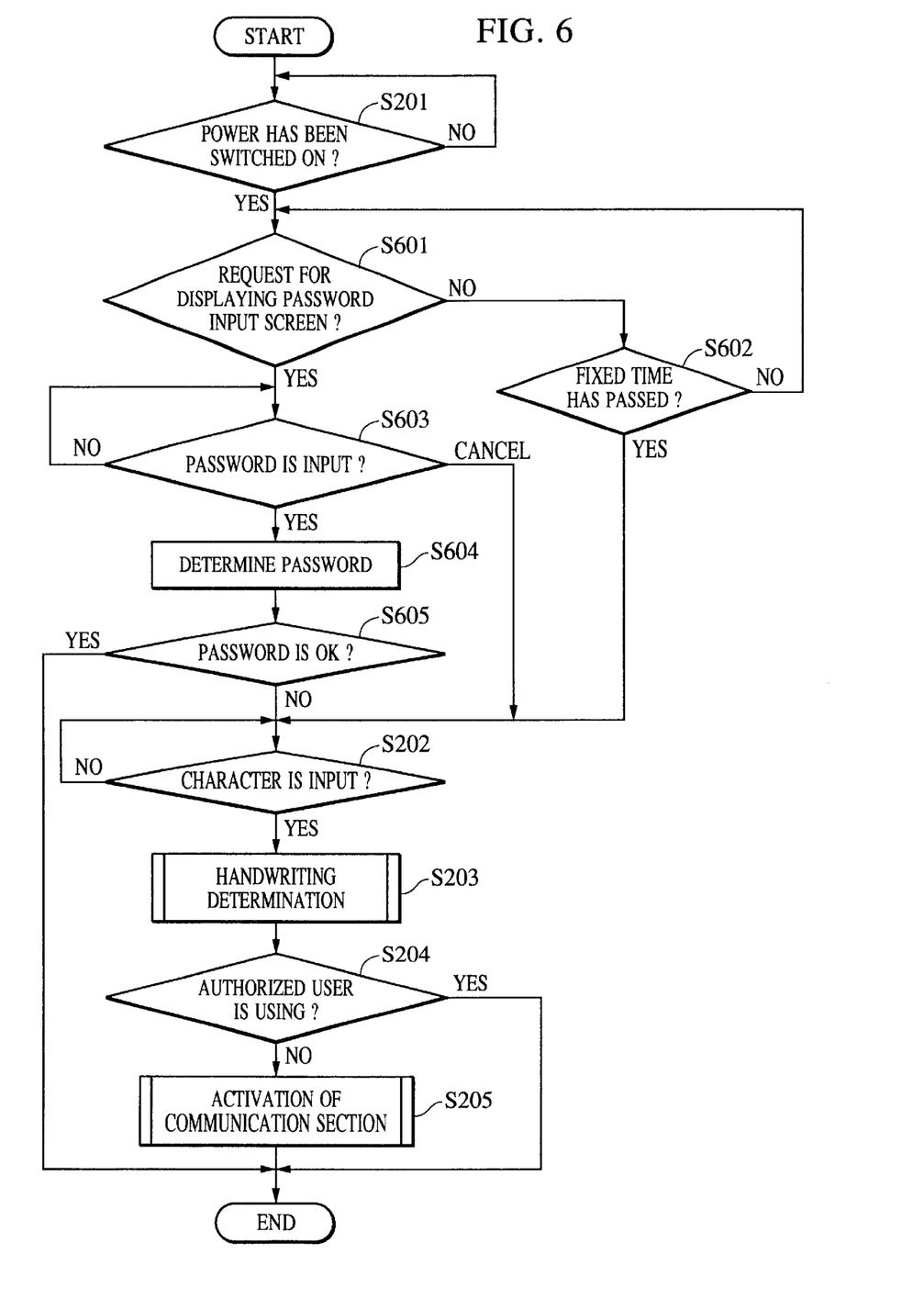
FIG. 6 is a flowchart of a third embodiment of the present invention.

FIG. 6 is a flowchart for describing in detail the process in this embodiment. Here, the processes which are the same as those of the above-described embodiments are given the same step numbers, and only different processing steps are described.

When it is determined in step S201 that the power has been switched on, the process proceeds to step S601, where a determination is made as to whether a request for displaying a password input screen has been made by the user. This display request may be made by drawing a predetermined mark using the pen input apparatus 101 or by pressing a specified combination of buttons.

At this point, if there is no display request, the process proceeds to step S602, and steps S601 and S602 are repeated until a preset fixed time passes. When it is determined that there is no password input screen display request for a fixed time, the process proceeds to step S202.

In contrast, when it is determined in step S601 that a password input screen display request has been made, the process proceeds to step S603, where the password input screen is displayed and a password input is awaited. Here, when there is no password input, the input wait state is maintained, and when the password input has been cancelled, the process proceeds to step S202. When a password is input, the process proceeds to steps S604 and S605, where the password is determined.

When it is determined in step S605 that the password input in step S603 is a correct one which matches the password preset by the authorized user, the current user is permitted to be an authorized user, and the process terminates without performing the subsequent processes shown in FIG. 6. When the password is not a correct one, the process proceeds to step S202 and subsequent steps. Those subsequent steps (steps S202 to S205) are the same as those of the first embodiment.

According to this embodiment, since the authorization of the user using a password input is performed, the process for determining whether the current user is the same as the authorized user is not required to be performed by extracting the features of the current user and comparing the extracted features with the features of the authorized user. Therefore, this determination result avoids unnecessary communications with the server by the communication section 109 being performed. The ease of use is improved for the user in the same manner as in the above-described embodiments, and if the portable terminal apparatus is battery driven, the battery's service life can be prolonged.

(d) Fourth Embodiment

Although the first to third embodiments describe up to a part in which the portable terminal apparatus detects an unauthorized use thereof and notifies the server of that fact, it is possible for a server which receives such notification to take a protective measure against the unauthorized use of the portable terminal apparatus. In this fourth embodiment, such an example will be described.

Figure 8:
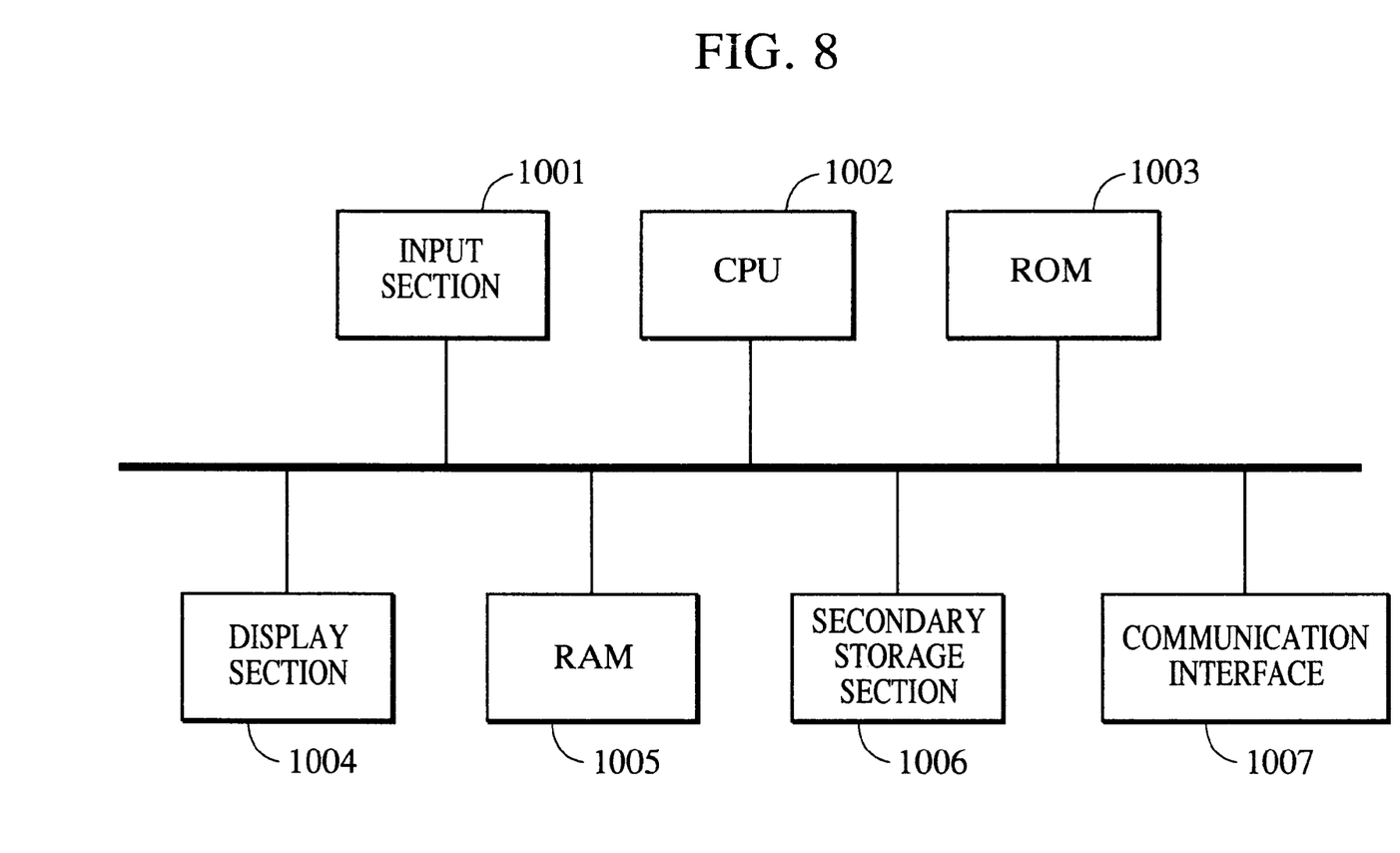
FIG. 8 is a block diagram showing a server of a fourth embodiment of the present invention.

FIG. 8 is a block diagram showing the hardware configuration of the server of this embodiment. In FIG. 8, reference numeral 1001 denotes an input section. Reference numeral 1002 denotes a CPU. Reference numeral 1003 denotes a ROM. Reference numeral 1004 denotes a display section. Reference numeral 1005 denotes a RAM. Reference numeral 1006 denotes a secondary storage section. The secondary storage section 1006 has stored therein communication programs with the portable terminal apparatus and a data deletion program. Further, reference numeral 1007 denotes a communication interface for connection with the network. The configuration of the entire system formed of the server and the portable terminal apparatus is the same as that in FIG. 3. However, although only one portable terminal apparatus is described in FIG. 3, in this embodiment, it is assumed that a plurality of portable terminal apparatuses are assigned to one server.

The operation of the fourth embodiment will be described below in detail with reference to FIGS. 9 and 10.

Figure 9:
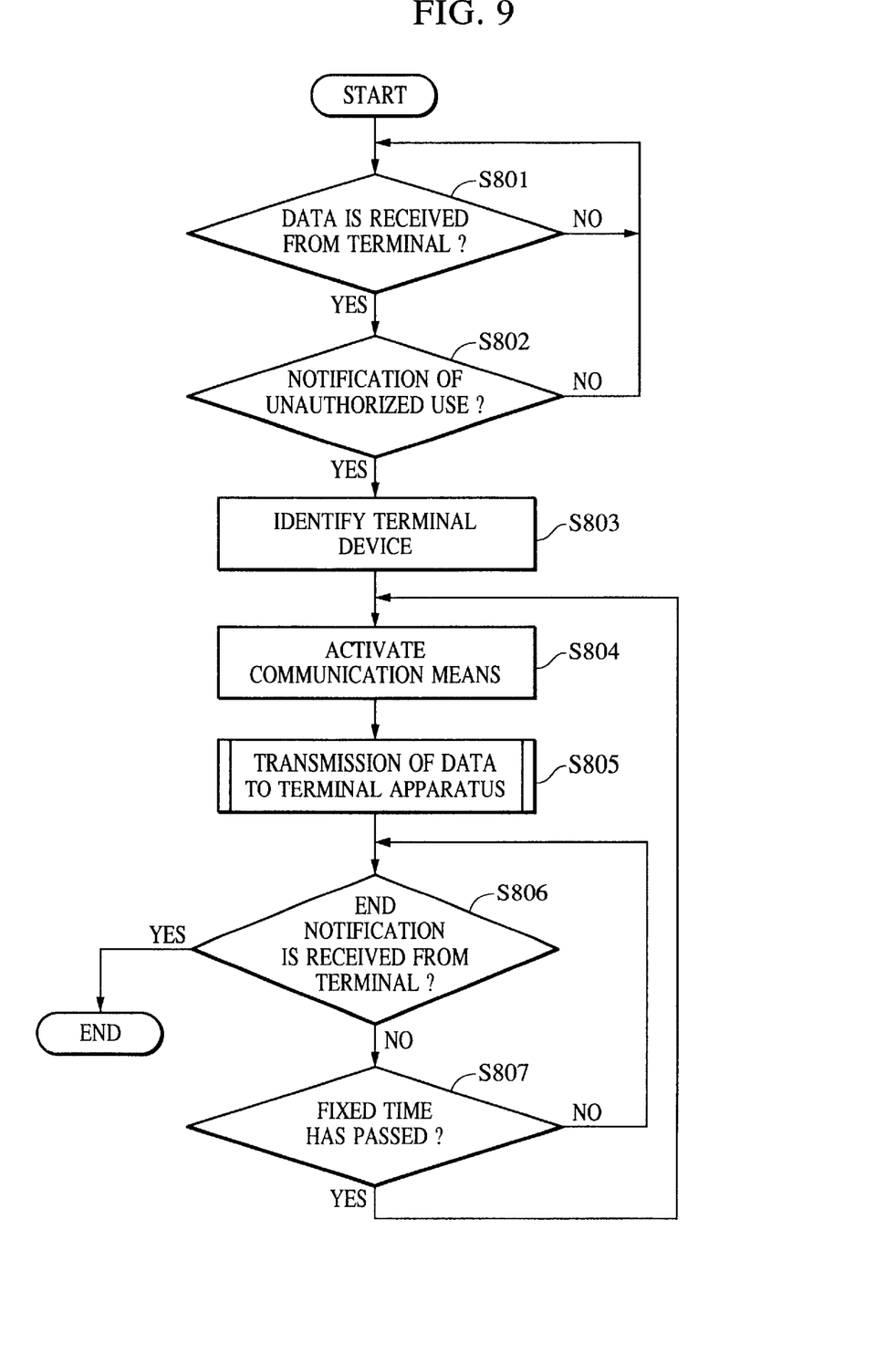
FIG. 9 is a flowchart showing the operation of the server according to the fourth embodiment of the present invention.

FIG. 9 is a flowchart showing the operation of the server in this embodiment.

Initially, the same process as that of the first embodiment is performed. When any one of the portable terminal apparatuses assigned to the server is used illegally, a communication notifying of the unauthorized use is sent from the portable terminal apparatus to the server. When it is determined in step S801 that data is received from one of the portable terminal apparatuses, the process proceeds to step S802. When it is determined in this step that the data indicates unauthorized use, the process proceeds to step S803. In step S803, the portable terminal apparatus which is used without authorization is identified from among the plurality of connected portable terminal apparatuses on the basis of the received information.

Next, the process proceeds to step S804 where a communication program for the identified portable terminal apparatus is read from the secondary storage section 1006 and activated, making it possible to perform communications with the identified portable terminal apparatus. Next, the process proceeds to step S805, where the data deletion program is read from the secondary storage section 1006 and it is transmitted to the identified portable terminal apparatus. Since this transmission procedure is a known technology, description thereof has been omitted here.

Next, the process proceeds to step S806, where the process enters a state in which the reception of data from the portable terminal apparatus which transmitted the data deletion program is awaited. When a notification of the termination of the execution of the data deletion program is received from the portable terminal apparatus, a series of operations are terminated. Here, when the notification of the termination of the data deletion program is not returned from the portable terminal apparatus for a preset fixed time, the process returns from step S807 to step S804, where the communication program from the identified portable terminal apparatus is read for the secondary storage section 1006 and activated again.

Figure 10:
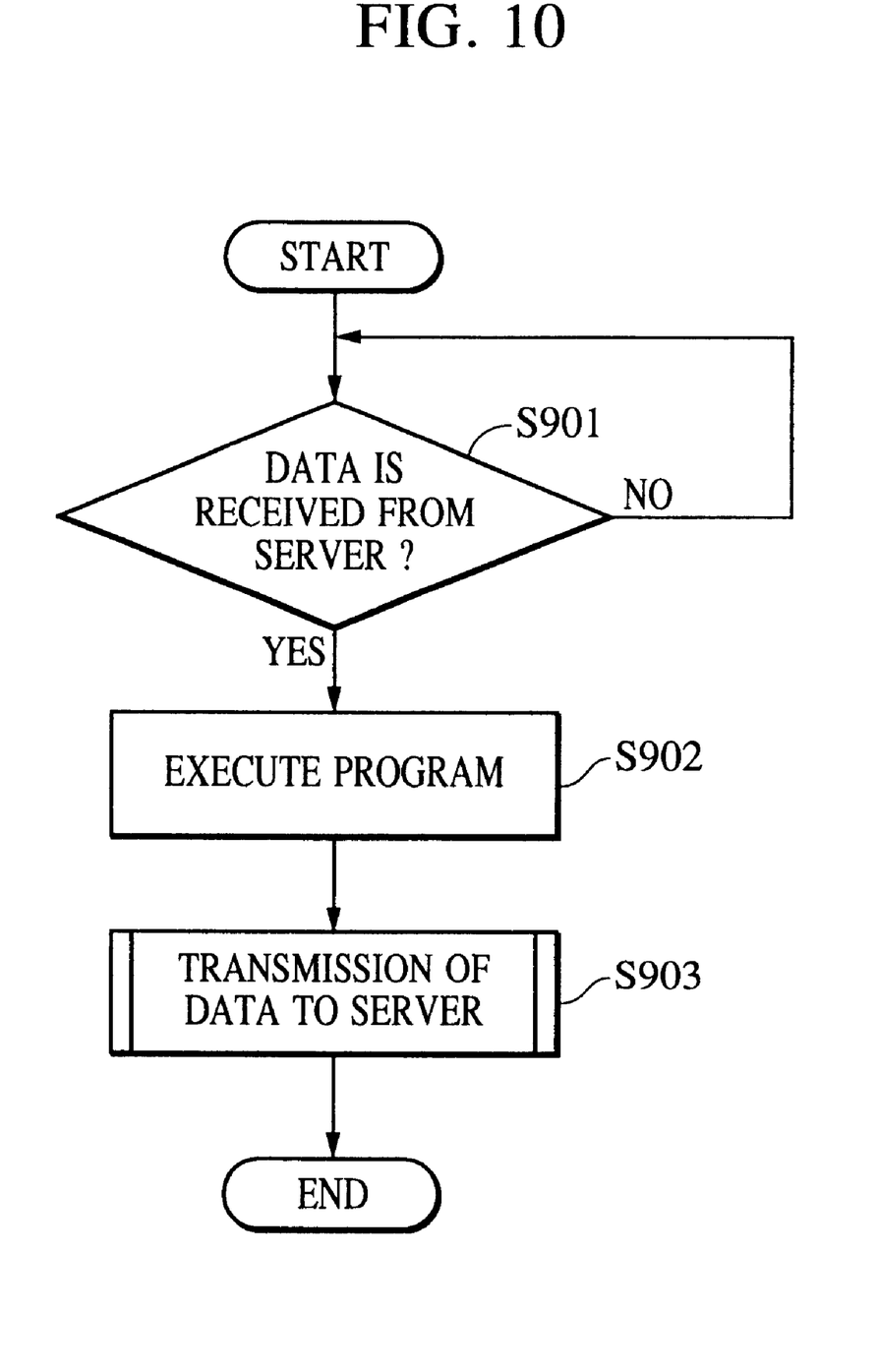
FIG. 10 is a flowchart showing the operation of the portable terminal apparatus according to the fourth embodiment of the present invention.

FIG. 10 is a flowchart showing the operation of the portable terminal apparatus in this embodiment.

Initially, when it is determined in step S901 that the data deletion program has been received from the server, the process proceeds to step S902, where the data deletion program is executed. Then, when the execution of the data deletion program is terminated, the process proceeds to step S903, where the fact that the execution of the data deletion program has been terminated is communicated to the server.

As described in the foregoing, according to the fourth embodiment, the server which is notified of the fact that the portable terminal apparatus is being used illegally can take protective measures immediately.

Further, in this fourth embodiment, the data which is transmitted from the server to the portable terminal apparatus is a data deletion program. However, a construction is possible in which a simple warning message or a program for locking the execution of the application is transmitted. Furthermore, a construction is possible in which the data deletion program is stored in the portable terminal apparatus in advance and a subprogram for activating the program is transmitted from the server.

In addition, since communication is performed from the portable terminal apparatus, the server becomes aware of the current position of the portable terminal apparatus in accordance with the position of the base station of the PHS in use; therefore, a warning message including the fact that the current position is known to the server manager, may be transmitted.

Further, the response from the server may be performed by the user of the server, and a response program may be stored in the server in advance so as to respond automatically.

As has been described up to this point, according to the first to fourth embodiments, when the portable terminal apparatus is used by a user who is not an authorized user, even if the user who is using the apparatus currently does not perform an operation for accessing the server, it is possible to notify the server of the fact that another user is currently using the unit, by extracting the features of the current user's handwriting, and it is thus possible for the authorized user to become aware of this unauthorized use.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A portable terminal apparatus, comprising:
   memory for storing handwriting information of an authorized user and a password of the authorized user;
   communication means for performing communication with an external apparatus;
   handwriting information input means for inputting handwriting information of a current user;
   first judgment means for judging whether the current user is the authorized user by comparing the handwriting information of the current user with the handwriting information of the authorized user;
   determining means for determining whether a request for displaying a password input screen has been made by the user;
   password input means for inputting a password of the current user on the displayed password input screen when said determining means determines that the request has been made;
   second judgment means for judging whether the current user is the authorized user by comparing the password of the current user with the password of the authorized user; and
   informing means for automatically informing the external apparatus about an unauthorized use of the portable terminal apparatus by using said communication means when said first judgment means and said second judgment means judge the current user is not the authorized user.

2. A portable terminal apparatus according to claim 1, wherein said handwriting information input means includes pen input means and inputs the handwriting information of the current user by using said pen input means.

3. A portable terminal apparatus according to claim 2, wherein the handwriting information of the authorized user is handwriting features of the authorized user, and wherein said first judgment means extracts features of the handwriting of the current user from the handwriting information of the current user input by pen input means, and judges whether the current user is the authorized user by comparing the handwriting features of the current user with the handwriting features of the authorized user.

4. A portable terminal apparatus according to claim 1, wherein said informing means does not inform the external apparatus about an unauthorized use of the portable terminal apparatus when at least one of said first judgment means and said second judgment means judge the current user is the same as the authorized user.

5. A portable terminal apparatus according to claim 1, wherein said communication means is adapted to communicate with the external apparatus over a network.

6. A portable terminal apparatus according to claim 1, wherein the request for displaying the password input screen is made by drawing a predetermined mark by said handwriting information input means.

7. A portable terminal apparatus according to claim 1, wherein the request for displaying the password input screen is made by pressing a specified combination of buttons.

8. A communication method for use with a portable terminal apparatus comprising memory for storing handwriting information of an authorized user and a password of the authorized user, and communication means for performing communication with an external apparatus, and handwriting information input means for inputting handwriting information of a current user, and password input means for inputting a password of the current user on a password input screen, said communication method composing:
   a first judgment step, of judging whether the current user is the authorized user by comparing the handwriting information of the current user with the handwriting information of the authorized user;
   a determining step, of determining whether a request for displaying the password input screen has been made by the user;
   a second judgment step, of judging whether the current user is the authorized user by comparing the password of the current user with the password of the authorized user; and
   an informing step, of automatically informing the external apparatus about an unauthorized use of the portable terminal apparatus by using the communication means when it is judged in said first judgment step and said second judgment step that the current user is not the authorized user.

9. A communication method according to claim 8, wherein the handwriting information input means inputs the handwriting information of the current user by using pen input means.

10. A communication method according to claim 9, wherein the handwriting information of the authorized user is handwriting features of the authorized user, and wherein said first judgment step includes extracting the features of the handwriting of the current user from the handwriting information of the current user input by pen input means, and judging whether the current user is the authorized user by comparing the handwriting features of the current user with the handwriting features of the authorized user.

11. A communication method according to claim 8, wherein the communication means communicates with the external apparatus over a network.

12. A communication method according to claim 8, wherein said informing step is not performed to inform the external apparatus about an unauthorized use of the portable terminal apparatus when it is judged in at least one of said first judgment step and said second judgment step that the current user is the same as the authorized user.

13. A communication method for use with a portable terminal apparatus comprising memory for storing character recognition rate for handwriting information of an authorized user and a password of the authorized user, and communication means for performing communication with an external apparatus, and handwriting information input means for inputting handwriting information of a current user, and password input means for inputting a password of the current user on a password input screen, said communication method comprising:

a character recognition step, of character-recognizing the handwriting information input using the information input means and calculating a character recognition rate for handwriting information of the current user;

a first judgment step, of judging whether the current user is the authorized user by comparing the character recognition rate of the current user with the character recognition rate of the authorized user;

a determining step, of determining whether a request for displaying a password input screen has been made by the user;

a second judgment step, of judging whether the current user is the authorized user by comparing the password of the current user with the password of the authorized user; and an informing step, of automatically informing the external apparatus about an unauthorized use of the portable terminal apparatus by using the communication means when it is judged in said first judgment step and said second judgment step that the current user is not the authorized user.

14. A communication system, comprising:
a portable terminal apparatus; and
a server, said portable terminal apparatus and said server performing communication,
wherein said portable terminal apparatus comprises:
memory for storing handwriting information of an authorized user and a password of the authorized user;
handwriting information input means for inputting handwriting information of a current user;
first judgment means for judging whether the current user is the authorized user by comparing the handwriting information of the current user with the handwriting information of the authorized user;
determining means for determining whether a request for displaying a password input screen has been made by the user;
password input means for inputting a password of the current user on the displayed password input screen when said determining means determines that the request has been made;

second judgment means for judging whether the current user is the authorized user by comparing the password of the current user with the password of the authorized user; and informing means for automatically informing the server about an unauthorized use of the portable terminal apparatus when said first judgment means and said second judgment means judge the current user is not the authorized user, and wherein said server comprises:
receiving means for receiving the unauthorized use information; and
transmission means for transmitting predetermined data to said portable terminal apparatus.

15. A communication system according to claim 14, comprising a plurality of such portable terminal apparatus, and wherein said server further comprises identification means for identifying the portable terminal apparatus which informs the unauthorized use information received by said receiving means, and wherein said transmission means transmits predetermined data to the portable terminal apparatus identified by said identification means.

16. A communication system according to claim 14, wherein said transmission means transmits a warning message.

17. A communication system according to claim 14, wherein said transmission means transmits an application program for locking execution of the application within said portable terminal apparatus.

18. A communication system according to claim 14, wherein said server further comprises position determination means for determining the position of said portable terminal apparatus, and wherein said transmission means transmits the data indicating the position determined by said position determination means together with a warning message.

19. A communication system according to claim 14, wherein said portable terminal apparatus and said server perform communication over a network.

20. A portable terminal apparatus, comprising:
memory for storing information of an authorized user;
communication means for performing communication with an external apparatus;
information input means for inputting information of a current user;
judgment means for judging whether the current user is the authorized user by comparing the information of the current user with the information of the authorized user;
informing means for automatically informing the external apparatus about an unauthorized use of the portable terminal apparatus by using said communication means when said judgment means judges the current user is not the authorized user; and
executing means for executing a data deletion program which deletes the data within the portable terminal apparatus if the data deletion program is transmitted from the external apparatus in response to the unauthorized use informed by said informing means.

21. A portable terminal apparatus, comprising:
memory for storing information of an unauthorized user and a data deletion program for deleting the data within the portable terminal apparatus;
communication means for performing communication with an external apparatus;

information input means for inputting information of a current user;

judgment means for judging whether the current user is the authorized user by comparing the information of the current user with the information of the authorized user;

informing means for automatically informing the external apparatus about an unauthorized use of the portable terminal apparatus by using said communication means when said judgment means judges the current user is not the authorized user; and executing means for executing the stored data deletion program which deletes the data within the portable terminal apparatus if a subprogram for activating the stored data deletion program is transmitted from the external apparatus in response to the unauthorized use informed by said informing means.

22. A communication method for use with a portable terminal apparatus comprising memory for storing information of an authorized user, and communication means for performing communication with an external apparatus, and information input means for inputting information of a current user, said communication method comprising:

a judgment step, of judging whether the current user is the authorized user by comparing the information of the current user with the information of the authorized user;

an informing step, of automatically informing the external apparatus about an unauthorized use of the portable terminal apparatus by using said communication means when it is judged in said judgment step that the current user is not the authorized user; and an executing step, of executing a data deletion program which deletes the data within the portable terminal apparatus if the data deletion program is transmitted from the external apparatus in response to the unauthorized use informed in said informing step.

23. A communication method for use with a portable terminal apparatus comprising memory for storing information of an authorized user and a data deletion program for deleting the data within the portable terminal apparatus, and communication means for performing communication with an external apparatus, and information input means for inputting information of a current user, said communication method comprising:

a judgment step, of judging whether the current user is the authorized user by comparing the information of the current user with the information of the authorized user;

an informing step, of automatically informing the external apparatus about an unauthorized use of the portable terminal apparatus by using said communication means when it is judged in said judgment step that the current user is not the authorized user; and an executing step, of executing the stored data deletion program which deletes the data within the portable terminal apparatus if a subprogram for activating the stored data deletion program is transmitted from the external apparatus in response to the unauthorized use informed in said informing step.

24. A portable terminal apparatus comprising:

memory for storing character recognition rate for handwriting information of an authorized user and a password of the authorized user;

communication means for performing communication with an external apparatus;

handwriting information input means for inputting handwriting information of a current user;

character recognition means for character-recognizing the handwriting information input by said information input means and calculating a character recognition rate for handwriting information of the current user;

first judgment means for judging whether the current user is the authorized user by comparing the character recognition rate of the current user with the character recognition rate of the authorized user;

determining means for determining whether a request for displaying a password input screen has been made by the user;

password input means for inputting a password of the current user on the displayed password input screen when said determining means determines that the request has been made;

second judgment means for judging whether the current user is the authorized user by comparing the password of the current user with the password of the authorized user; and informing means for automatically informing the external apparatus about an unauthorized use of the portable terminal apparatus by using said communication means when said first judgment means and said second judgment means judge the current user is not the authorized user.

25. A communication system, comprising:

a portable terminal apparatus; and a server, said portable terminal apparatus and said server performing communication, wherein said portable terminal apparatus comprises:

memory for storing information of an authorized user, data and a data deletion program for deleting the data;

information input means for inputting information of a current user;

judgment means for judging whether the current user is the authorized user by comparing the information of the current user with the information of the authorized user; and informing means for automatically informing the server about an unauthorized use of the portable terminal apparatus when said judgment means judges the current user is not the authorized user, and wherein said server comprises:

receiving means for receiving the unauthorized use information; and transmission means for transmitting, to said portable terminal apparatus, a subprogram for activating the data deletion program stored.

26. A computer-readable medium storing a program for use with a computer comprising memory for storing handwriting information of an authorized user, and a password of the authorized user, and communication means for performing communication with an external apparatus, and handwriting information input means for handwriting inputting information of a current user, and password input means for inputting a password of the current user on a password input screen, said program comprising:

a first judgment step, of judging whether the current user is the authorized user by comparing the handwriting information of the current user with the handwriting information of the authorized user;

a determining step, of determining whether a request for displaying the password input screen has been made by the user;

a second judgment step, of judging whether the current user is the authorized user by comparing the password of the current user with the password of the authorized user; and an informing step, of automatically informing the external apparatus about an unauthorized use of the computer by using the communication means when it is judged in said judgment step that the current user is not the authorized user.

27. A communication system, comprising:

a portable terminal apparatus; and a server, said portable terminal apparatus and said server performing communication, wherein said portable terminal apparatus comprises:
memory for storing information of an authorized user;
information input means for inputting information of a current user;
judgment means for judging whether the current user is the authorized user by comparing the information of the current user with the information of the authorized user; and
informing means for automatically informing the server about an unauthorized use of the portable terminal apparatus when said judgment means judges the current user is not the authorized user, and wherein said server comprises:
receiving means for receiving the unauthorized use information; and
transmission means for transmitting, to said portable terminal apparatus, a data deletion program which deletes the data within the portable terminal apparatus.

* * * * *